US008280030B2

(12) United States Patent
Bushey et al.

(10) Patent No.: US 8,280,030 B2
(45) Date of Patent: *Oct. 2, 2012

(54) CALL ROUTING SYSTEM AND METHOD OF USING THE SAME

(75) Inventors: Robert R Bushey, Cedar Park, TX (US); Sarah Korth, Chicago, IL (US); Benjamin Anthony Knott, Round Rock, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/637,568

(22) Filed: Dec. 14, 2009

(65) Prior Publication Data

US 2010/0091978 A1    Apr. 15, 2010

Related U.S. Application Data

(63) Continuation of application No. 11/144,375, filed on Jun. 3, 2005, now Pat. No. 7,657,020.

(51) Int. Cl.
*H04M 3/00* (2006.01)
*H04M 5/00* (2006.01)
*H04M 1/56* (2006.01)
*H04M 15/06* (2006.01)

(52) U.S. Cl. .......... 379/265.01; 379/142.05; 379/265.02

(58) Field of Classification Search ............. 379/265.01, 379/114.02, 88.03, 88.01, 142.05, 265.02, 379/218.01; 455/410
See application file for complete search history.

(56) References Cited

U.S. PATENT DOCUMENTS

| 3,811,012 | A | 5/1974  | Barber            |
| 4,696,028 | A | 9/1987  | Morganstein et al.|
| 4,760,593 | A | 7/1988  | Shapiro et al.    |
| 4,788,715 | A | 11/1988 | Lee               |
| 4,935,927 | A | 6/1990  | Kaewell, Jr. et al.|
| 4,953,204 | A | 8/1990  | Cuschleg, Jr. et al.|
| 4,964,077 | A | 10/1990 | Eisen et al.      |
| 4,967,405 | A | 10/1990 | Upp et al.        |
| 4,975,841 | A | 12/1990 | Kehnemuyi et al.  |
| 4,989,230 | A | 1/1991  | Gillig et al.     |

(Continued)

FOREIGN PATENT DOCUMENTS

EP    0424015 A2    4/1991

(Continued)

OTHER PUBLICATIONS

International Search Report and Written Opinion of the International Searching Authority for International Application No. PCT/US05/43789, Mailed on Jul. 30, 2008, 11 pages.

(Continued)

*Primary Examiner* — Thjuan K Addy
(74) *Attorney, Agent, or Firm* — Toler Law Group, PC (57) ABSTRACT

A particular method of using a call routing system includes generating a first action object identifier associated with a task, a first result identifier associated with the task, and a first reason identifier at a first module in response to a call using a processor of the call routing system. The first result identifier has a value that indicates a status of the task. The first reason identifier includes information related to the first result identifier. The method also includes routing the call from the first module to a second module using the processor, based at least in part on the first action object identifier, the first result identifier, and the first reason identifier.

20 Claims, 6 Drawing Sheets

U.S. PATENT DOCUMENTS

| | | |
|---|---|---|
| 5,042,006 A | 8/1991 | Flohrer |
| 5,113,430 A | 5/1992 | Richardson, Jr. et al. |
| 5,125,024 A | 6/1992 | Gokcen et al. |
| 5,127,042 A | 6/1992 | Gillig et al. |
| 5,142,695 A | 8/1992 | Roberts et al. |
| 5,155,759 A | 10/1992 | Saegusa et al. |
| 5,187,735 A | 2/1993 | Herrero Garcia et al. |
| 5,218,716 A | 6/1993 | Comroe et al. |
| 5,229,701 A | 7/1993 | Leman et al. |
| 5,235,679 A | 8/1993 | Yoshizawa et al. |
| 5,241,678 A | 8/1993 | Futamura et al. |
| 5,247,567 A | 9/1993 | Hirano |
| 5,260,988 A | 11/1993 | Schellinger et al. |
| 5,297,183 A | 3/1994 | Bareis et al. |
| 5,299,260 A | 3/1994 | Shaio |
| 5,309,509 A | 5/1994 | Cocklin et al. |
| 5,311,574 A | 5/1994 | Livanos |
| 5,335,269 A | 8/1994 | Steinlicht |
| 5,353,331 A | 10/1994 | Emery et al. |
| 5,367,558 A | 11/1994 | Gillig et al. |
| 5,415,416 A | 5/1995 | Scagnelli et al. |
| 5,416,830 A | 5/1995 | MacMillan, Jr. et al. |
| 5,432,845 A | 7/1995 | Burd et al. |
| 5,442,680 A | 8/1995 | Schellinger et al. |
| 5,455,903 A | 10/1995 | Jolissaint et al. |
| 5,469,496 A | 11/1995 | Emery et al. |
| 5,497,373 A | 3/1996 | Hulen et al. |
| 5,515,366 A | 5/1996 | Chieu et al. |
| 5,522,046 A | 5/1996 | McMillen et al. |
| 5,530,744 A | 6/1996 | Charalambous et al. |
| 5,546,542 A | 8/1996 | Cosares et al. |
| 5,550,895 A | 8/1996 | Burson et al. |
| 5,553,117 A | 9/1996 | Peterson et al. |
| 5,555,299 A | 9/1996 | Maloney et al. |
| 5,559,860 A | 9/1996 | Mizikovsky |
| 5,590,186 A | 12/1996 | Liao et al. |
| 5,598,460 A | 1/1997 | Tendler |
| 5,621,789 A | 4/1997 | McCalmont et al. |
| 5,627,971 A | 5/1997 | Miernik |
| 5,630,121 A | 5/1997 | Braden-Harder et al. |
| 5,632,002 A | 5/1997 | Hashimoto et al. |
| 5,636,243 A | 6/1997 | Tanaka |
| 5,644,620 A | 7/1997 | Shimura |
| 5,652,789 A | 7/1997 | Miner et al. |
| 5,659,599 A | 8/1997 | Arumainayagam et al. |
| 5,673,308 A | 9/1997 | Akhavan |
| 5,675,707 A | 10/1997 | Gorin et al. |
| 5,675,817 A | 10/1997 | Moughanni et al. |
| 5,729,600 A | 3/1998 | Blaha et al. |
| 5,732,133 A | 3/1998 | Mark |
| 5,732,395 A | 3/1998 | Silverman |
| 5,737,703 A | 4/1998 | Byrne |
| 5,745,850 A | 4/1998 | Aldermeshian et al. |
| 5,748,147 A | 5/1998 | Bickley et al. |
| 5,754,639 A | 5/1998 | Flockhart et al. |
| 5,754,978 A | 5/1998 | Perez-Mendez et al. |
| 5,761,432 A | 6/1998 | Bergholm et al. |
| 5,787,360 A | 7/1998 | Johnston et al. |
| 5,794,001 A | 8/1998 | Malone et al. |
| 5,809,269 A | 9/1998 | Favot et al. |
| 5,828,735 A | 10/1998 | Farfan |
| 5,842,112 A | 11/1998 | Fuller et al. |
| 5,845,062 A | 12/1998 | Branton, Jr. et al. |
| 5,867,495 A | 2/1999 | Elliott et al. |
| 5,867,562 A | 2/1999 | Scherer |
| 5,867,817 A | 2/1999 | Catallo et al. |
| 5,900,608 A | 5/1999 | Iida |
| 5,905,793 A | 5/1999 | Flockhart et al. |
| 5,917,903 A | 6/1999 | Jolissaint |
| 5,918,213 A | 6/1999 | Bernard et al. |
| 5,923,646 A | 7/1999 | Mandhyan |
| 5,923,745 A | 7/1999 | Hurd |
| 5,930,337 A | 7/1999 | Mohler |
| 5,937,051 A | 8/1999 | Hurd et al. |
| 5,940,476 A | 8/1999 | Morganstein et al. |
| 5,946,377 A | 8/1999 | Wolf |
| 5,946,388 A | 8/1999 | Walker et al. |
| 5,950,133 A | 9/1999 | Bledsoe |
| 5,953,704 A | 9/1999 | McIlroy et al. |
| 5,960,384 A | 9/1999 | Brash |
| 5,974,127 A | 10/1999 | Wernli et al. |
| 5,978,463 A | 11/1999 | Jurkevics et al. |
| 5,987,116 A | 11/1999 | Petrunka et al. |
| 5,991,756 A | 11/1999 | Wu |
| 5,995,839 A | 11/1999 | Coursey et al. |
| 5,995,979 A | 11/1999 | Cochran |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,014,439 A | 1/2000 | Walker et al. |
| 6,028,601 A | 2/2000 | Machiraju et al. |
| 6,038,293 A | 3/2000 | McNerney et al. |
| 6,038,305 A | 3/2000 | McAllister et al. |
| 6,041,229 A | 3/2000 | Turner |
| 6,044,146 A | 3/2000 | Gisby et al. |
| 6,049,594 A | 4/2000 | Furman et al. |
| 6,061,335 A | 5/2000 | De Vito et al. |
| 6,061,433 A | 5/2000 | Polcyn et al. |
| 6,064,731 A | 5/2000 | Flockhart et al. |
| 6,069,588 A | 5/2000 | O'Neill, Jr. |
| 6,073,031 A | 6/2000 | Helstab et al. |
| 6,091,949 A | 7/2000 | Sanchez |
| 6,100,885 A | 8/2000 | Donnelly et al. |
| 6,118,796 A | 9/2000 | Best et al. |
| 6,118,866 A | 9/2000 | Shtivelman |
| 6,119,101 A | 9/2000 | Peckover |
| 6,130,938 A | 10/2000 | Erb |
| 6,130,942 A | 10/2000 | Stenlund |
| 6,144,938 A | 11/2000 | Surace et al. |
| RE37,001 E | 12/2000 | Morganstein et al. |
| 6,157,655 A | 12/2000 | Shtivelman |
| 6,173,042 B1 | 1/2001 | Wu |
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja |
| 6,182,052 B1 | 1/2001 | Fulton et al. |
| 6,185,427 B1 | 2/2001 | Krasner et al. |
| 6,188,888 B1 | 2/2001 | Bartle et al. |
| 6,201,950 B1 | 3/2001 | Fuller et al. |
| 6,208,854 B1 | 3/2001 | Roberts et al. |
| 6,219,805 B1 | 4/2001 | Jones et al. |
| 6,233,313 B1 | 5/2001 | Farris et al. |
| 6,233,546 B1 | 5/2001 | Datig |
| 6,240,181 B1 | 5/2001 | Tunstall |
| 6,240,297 B1 | 5/2001 | Jadoul |
| 6,246,986 B1 | 6/2001 | Ammicht et al. |
| 6,259,786 B1 | 7/2001 | Gisby |
| 6,260,014 B1 | 7/2001 | Bahl et al. |
| 6,269,153 B1 | 7/2001 | Carpenter et al. |
| 6,269,336 B1 | 7/2001 | Ladd et al. |
| 6,301,350 B1 | 10/2001 | Henningson et al. |
| 6,314,402 B1 | 11/2001 | Monaco et al. |
| 6,317,439 B1 | 11/2001 | Cardona et al. |
| 6,317,884 B1 | 11/2001 | Eames et al. |
| 6,320,534 B1 | 11/2001 | Goss |
| 6,320,951 B1 | 11/2001 | Shtivelman et al. |
| 6,327,350 B1 | 12/2001 | Spangler et al. |
| 6,332,082 B1 | 12/2001 | Fuller et al. |
| 6,334,127 B1 | 12/2001 | Bieganski et al. |
| 6,339,980 B1 | 1/2002 | Woolf |
| 6,353,608 B1 | 3/2002 | Cullers et al. |
| 6,356,936 B1 | 3/2002 | Donoho et al. |
| 6,362,778 B2 | 3/2002 | Neher |
| 6,366,658 B1 | 4/2002 | Bjornberg et al. |
| 6,366,668 B1 | 4/2002 | Borst et al. |
| 6,373,817 B1 | 4/2002 | Kung et al. |
| 6,377,662 B1 | 4/2002 | Hunt et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,411,687 B1 | 6/2002 | Bohacek et al. |
| 6,414,966 B1 | 7/2002 | Kulkarni et al. |

| Patent No. | Date | Inventor(s) |
|---|---|---|
| 6,418,424 B1 | 7/2002 | Hoffberg et al. |
| 6,421,433 B1 | 7/2002 | Arsenault |
| 6,424,840 B1 | 7/2002 | Fitch et al. |
| 6,434,546 B1 | 8/2002 | Williamowski et al. |
| 6,438,520 B1 | 8/2002 | Curt et al. |
| 6,442,247 B1 | 8/2002 | Garcia |
| 6,449,226 B1 | 9/2002 | Kumagai |
| 6,480,593 B1 | 11/2002 | Munday et al. |
| 6,483,895 B2 | 11/2002 | Bixler et al. |
| 6,483,897 B1 | 11/2002 | Millrod |
| 6,483,899 B2 | 11/2002 | Agraharam et al. |
| 6,484,027 B1 | 11/2002 | Mauney et al. |
| 6,496,567 B1 | 12/2002 | Bjornberg et al. |
| 6,496,836 B1 | 12/2002 | Ronchi et al. |
| 6,505,055 B1 | 1/2003 | Kahn et al. |
| 6,509,833 B2 | 1/2003 | Tate |
| 6,510,414 B1 | 1/2003 | Chaves |
| 6,513,010 B1 | 1/2003 | Lewin et al. |
| 6,516,060 B1 | 2/2003 | Foladare et al. |
| 6,519,562 B1 | 2/2003 | Phillips et al. |
| 6,526,126 B1 | 2/2003 | Morganstein et al. |
| 6,529,871 B1 | 3/2003 | Kanevsky et al. |
| 6,532,444 B1 | 3/2003 | Weber |
| 6,538,666 B1 | 3/2003 | Ozawa et al. |
| 6,546,087 B2 | 4/2003 | Shaffer et al. |
| 6,553,112 B2 | 4/2003 | Ishikawa |
| 6,553,113 B1 | 4/2003 | Dhir et al. |
| 6,556,671 B1 | 4/2003 | Beauvois |
| 6,560,329 B1 | 5/2003 | Draginich et al. |
| 6,570,967 B2 | 5/2003 | Katz |
| 6,571,240 B1 | 5/2003 | Ho et al. |
| 6,574,213 B1 | 6/2003 | Anandakumar et al. |
| 6,574,470 B1 | 6/2003 | Chow et al. |
| 6,574,599 B1 | 6/2003 | Lim et al. |
| 6,577,718 B1 | 6/2003 | Kalmanek, Jr. et al. |
| 6,584,180 B2 | 6/2003 | Nemoto |
| 6,584,191 B1 | 6/2003 | McPartlan et al. |
| 6,587,475 B1 | 7/2003 | Przygienda |
| 6,587,556 B1 | 7/2003 | Judkins et al. |
| 6,587,558 B2 | 7/2003 | Lo |
| 6,587,683 B1 | 7/2003 | Chow et al. |
| 6,598,021 B1 | 7/2003 | Shambaugh et al. |
| 6,598,136 B1 | 7/2003 | Norrod et al. |
| 6,600,734 B1 | 7/2003 | Gernert et al. |
| 6,600,736 B1 | 7/2003 | Ball et al. |
| 6,601,014 B1 | 7/2003 | Dempsey |
| 6,603,837 B1 | 8/2003 | Kesanupalli et al. |
| 6,603,854 B1 | 8/2003 | Judkins et al. |
| 6,606,744 B1 | 8/2003 | Mikurak |
| 6,611,681 B2 | 8/2003 | Henderson |
| 6,614,206 B1 | 9/2003 | Wong et al. |
| 6,614,781 B1 | 9/2003 | Elliott et al. |
| 6,614,784 B1 | 9/2003 | Glitho et al. |
| 6,615,248 B1 | 9/2003 | Smith |
| 6,625,423 B1 | 9/2003 | Wang |
| 6,631,186 B1 | 10/2003 | Adams et al. |
| 6,650,088 B1 | 11/2003 | Webb et al. |
| 6,662,163 B1 | 12/2003 | Albayrak et al. |
| 6,668,241 B2 | 12/2003 | Chen et al. |
| 6,678,355 B2 | 1/2004 | Eringis et al. |
| 6,678,360 B1 | 1/2004 | Katz |
| 6,678,718 B1 | 1/2004 | Khouri et al. |
| 6,680,935 B1 | 1/2004 | Kung et al. |
| 6,690,788 B1 | 2/2004 | Bauer et al. |
| 6,694,012 B1 | 2/2004 | Posthuma |
| 6,694,482 B1 | 2/2004 | Arellano et al. |
| 6,697,458 B1 | 2/2004 | Kunjibettu |
| 6,697,460 B2 | 2/2004 | Knott et al. |
| 6,697,467 B1 | 2/2004 | Schultz et al. |
| 6,700,972 B1 | 3/2004 | McHugh et al. |
| 6,704,404 B1 | 3/2004 | Burnett |
| 6,704,580 B1 | 3/2004 | Fintel |
| 6,707,789 B1 | 3/2004 | Arslan et al. |
| 6,711,253 B1 | 3/2004 | Prabhaker |
| 6,714,631 B1 | 3/2004 | Martin et al. |
| 6,714,643 B1 | 3/2004 | Gargeya et al. |
| 6,718,023 B1 | 4/2004 | Zolotov |
| 6,721,416 B1 | 4/2004 | Farrell |
| 6,731,625 B1 | 5/2004 | Eastep et al. |
| 6,731,722 B2 | 5/2004 | Coffey |
| 6,732,151 B1 | 5/2004 | Tobias et al. |
| 6,735,432 B1 | 5/2004 | Jarett et al. |
| 6,738,082 B1 | 5/2004 | Dong et al. |
| 6,738,473 B1 | 5/2004 | Burg et al. |
| 6,744,861 B1 | 6/2004 | Pershan et al. |
| 6,744,877 B1 | 6/2004 | Edwards |
| 6,751,306 B2 | 6/2004 | Himmel et al. |
| 6,751,591 B1 | 6/2004 | Gorin et al. |
| 6,757,306 B1 | 6/2004 | Klish, II et al. |
| 6,763,095 B1 | 7/2004 | Cermak et al. |
| 6,766,175 B2 | 7/2004 | Uchiyama |
| 6,766,320 B1 | 7/2004 | Wang et al. |
| 6,775,359 B1 | 8/2004 | Ron et al. |
| 6,778,643 B1 | 8/2004 | Bushey et al. |
| 6,792,096 B2 | 9/2004 | Martin et al. |
| 6,795,806 B1 | 9/2004 | Lewis et al. |
| 6,801,520 B2 | 10/2004 | Philonenko |
| 6,801,751 B1 | 10/2004 | Wood et al. |
| 6,807,274 B2 | 10/2004 | Joseph et al. |
| 6,823,307 B1 | 11/2004 | Steinbiss et al. |
| 6,826,264 B2 | 11/2004 | Valco et al. |
| 6,831,932 B1 | 12/2004 | Boyle et al. |
| 6,832,224 B2 | 12/2004 | Gilmour |
| 6,836,760 B1 | 12/2004 | Bellegarda et al. |
| 6,842,504 B2 | 1/2005 | Mills et al. |
| 6,847,711 B2 | 1/2005 | Knott et al. |
| 6,847,715 B1 | 1/2005 | Swartz |
| 6,850,611 B1 | 2/2005 | Chalk |
| 6,853,722 B2 | 2/2005 | Joseph et al. |
| 6,853,966 B2 | 2/2005 | Bushey et al. |
| 6,856,806 B1 | 2/2005 | Bosik et al. |
| 6,859,529 B2 | 2/2005 | Duncan et al. |
| 6,871,212 B2 | 3/2005 | Khouri et al. |
| 6,873,693 B1 | 3/2005 | Langseth et al. |
| 6,879,683 B1 | 4/2005 | Fain et al. |
| 6,882,641 B1 | 4/2005 | Gallick et al. |
| 6,882,723 B1 | 4/2005 | Peterson et al. |
| 6,885,734 B1 | 4/2005 | Eberle et al. |
| 6,891,932 B2 | 5/2005 | Bhargava et al. |
| 6,892,083 B2 | 5/2005 | Shostak |
| 6,892,169 B1 | 5/2005 | Campbell et al. |
| 6,895,083 B1 | 5/2005 | Bers et al. |
| 6,901,366 B1 | 5/2005 | Kuhn et al. |
| 6,907,119 B2 | 6/2005 | Case et al. |
| 6,909,708 B1 | 6/2005 | Krishnaswamy et al. |
| 6,914,974 B2 | 7/2005 | Bonnin |
| 6,915,246 B2 | 7/2005 | Gusler et al. |
| 6,925,155 B2 | 8/2005 | Reynolds et al. |
| 6,925,432 B2 | 8/2005 | Lee et al. |
| 6,937,975 B1 | 8/2005 | Elworthy |
| 6,944,592 B1 | 9/2005 | Pickering |
| 6,963,983 B1 | 11/2005 | Munson et al. |
| 6,970,554 B1 | 11/2005 | Peterson et al. |
| 6,978,154 B1 | 12/2005 | Ospalak et al. |
| 6,978,163 B2 | 12/2005 | Dyer et al. |
| 7,003,079 B1 | 2/2006 | McCarthy et al. |
| 7,006,605 B1 | 2/2006 | Morganstein et al. |
| 7,013,464 B2 | 3/2006 | Osborn |
| 7,016,849 B2 | 3/2006 | Arnold et al. |
| 7,024,368 B1 | 4/2006 | Matheson |
| 7,027,586 B2 | 4/2006 | Bushey et al. |
| 7,027,975 B1 | 4/2006 | Pazandak et al. |
| 7,031,444 B2 | 4/2006 | Shen et al. |
| 7,031,908 B1 | 4/2006 | Huang et al. |
| 7,035,388 B2 | 4/2006 | Kurosaki |
| 7,039,166 B1 | 5/2006 | Peterson et al. |
| 7,043,435 B2 | 5/2006 | Knott et al. |
| 7,062,029 B2 | 6/2006 | Lund |
| 7,062,505 B2 | 6/2006 | Lane et al. |
| 7,072,659 B2 | 7/2006 | White, Jr. |
| 7,076,049 B2 | 7/2006 | Bushey et al. |
| 7,076,695 B2 | 7/2006 | McGee et al. |
| 7,092,888 B1 | 8/2006 | McCarthy et al. |
| 7,103,165 B2 | 9/2006 | Baniak et al. |
| 7,103,542 B2 | 9/2006 | Doyle |
| 7,106,850 B2 | 9/2006 | Campbell et al. |
| 7,110,949 B2 | 9/2006 | Bushey et al. |
| 7,124,059 B2 | 10/2006 | Wetzer et al. |

| | | |
|---|---|---|
| 7,133,504 B2 | 11/2006 | Fostick |
| 7,133,828 B2 | 11/2006 | Scarano et al. |
| 7,139,390 B2 | 11/2006 | Brown et al. |
| 7,142,652 B2 | 11/2006 | Ho |
| 7,149,525 B2 | 12/2006 | White, Jr. |
| 7,177,792 B2 | 2/2007 | Knight et al. |
| 7,191,435 B2 | 3/2007 | Lau et al. |
| 7,197,130 B2 | 3/2007 | Paden et al. |
| 7,200,614 B2 | 4/2007 | Reid et al. |
| 7,206,400 B2 | 4/2007 | Dezonno et al. |
| 7,215,759 B2 | 5/2007 | Brown et al. |
| 7,231,343 B1 | 6/2007 | Treadgold et al. |
| 7,233,908 B1 | 6/2007 | Nelson |
| 7,233,980 B1 | 6/2007 | Holden et al. |
| 7,242,751 B2 | 7/2007 | Bushey et al. |
| 7,245,711 B2 | 7/2007 | Margolis |
| 7,245,716 B2 | 7/2007 | Brown et al. |
| 7,260,537 B2 | 8/2007 | Creamer et al. |
| 7,317,787 B2 | 1/2008 | Crockett et al. |
| 7,336,775 B2 | 2/2008 | Tanaka et al. |
| 7,346,507 B1 | 3/2008 | Natarajan et al. |
| 7,349,843 B1 | 3/2008 | Beck |
| 7,353,033 B2 | 4/2008 | Kwon |
| 7,356,685 B2 | 4/2008 | Backman |
| 7,370,086 B2 | 5/2008 | Kroeker et al. |
| 7,379,867 B2 | 5/2008 | Chelba et al. |
| 7,379,876 B2 | 5/2008 | Nakata |
| 7,415,101 B2 | 8/2008 | Bushey et al. |
| 7,421,389 B2 | 9/2008 | Reynolds et al. |
| 7,447,299 B1 | 11/2008 | Partovi et al. |
| 7,450,698 B2 | 11/2008 | Bushey et al. |
| 7,454,005 B2 | 11/2008 | Malik |
| 7,460,650 B2 | 12/2008 | Bushey et al. |
| 7,487,095 B2 | 2/2009 | Hill et al. |
| 7,487,112 B2 | 2/2009 | Barnes, Jr. |
| 7,551,723 B2 | 6/2009 | Mills et al. |
| 7,602,899 B1 | 10/2009 | Thenthiruperai |
| 7,620,159 B2 | 11/2009 | Pasquale et al. |
| 7,623,632 B2 | 11/2009 | Bushey et al. |
| 7,627,096 B2 | 12/2009 | Bushey et al. |
| 7,657,020 B2 | 2/2010 | Bushey et al. |
| 7,660,715 B1 | 2/2010 | Thambiratnam |
| 7,881,656 B2 | 2/2011 | Khedouri et al. |
| 2001/0011211 A1 | 8/2001 | Bushey et al. |
| 2001/0014599 A1 | 8/2001 | Henderson |
| 2001/0018672 A1 | 8/2001 | Petters et al. |
| 2001/0019604 A1 | 9/2001 | Joyce et al. |
| 2001/0019955 A1 | 9/2001 | Henderson |
| 2001/0021948 A1 | 9/2001 | Khouri et al. |
| 2001/0024497 A1 | 9/2001 | Campbell et al. |
| 2001/0026608 A1 | 10/2001 | Beyda et al. |
| 2001/0032075 A1 | 10/2001 | Yamamoto |
| 2001/0032229 A1 | 10/2001 | Hulls et al. |
| 2001/0033570 A1 | 10/2001 | Makam et al. |
| 2001/0034662 A1 | 10/2001 | Morris |
| 2002/0007303 A1 | 1/2002 | Brookler et al. |
| 2002/0023251 A1 | 2/2002 | Nasr et al. |
| 2002/0032675 A1 | 3/2002 | Williamowski et al. |
| 2002/0046030 A1 | 4/2002 | Haritsa et al. |
| 2002/0049874 A1 | 4/2002 | Kimura |
| 2002/0055975 A1 | 5/2002 | Petrovykh |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0064149 A1 | 5/2002 | Elliott et al. |
| 2002/0067714 A1 | 6/2002 | Crain et al. |
| 2002/0067820 A1 | 6/2002 | Benson et al. |
| 2002/0073434 A1 | 6/2002 | Pience |
| 2002/0080025 A1 | 6/2002 | Beattie |
| 2002/0087310 A1 | 7/2002 | Lee et al. |
| 2002/0087316 A1 | 7/2002 | Lee et al. |
| 2002/0087385 A1 | 7/2002 | Vincent |
| 2002/0087558 A1 | 7/2002 | Bailey et al. |
| 2002/0106065 A1 | 8/2002 | Joyce et al. |
| 2002/0111190 A1 | 8/2002 | Harrison et al. |
| 2002/0114432 A1 | 8/2002 | Shaffer et al. |
| 2002/0115480 A1 | 8/2002 | Huang |
| 2002/0116174 A1 | 8/2002 | Lee et al. |
| 2002/0116336 A1 | 8/2002 | Diacakis et al. |
| 2002/0119800 A1 | 8/2002 | Jaggers et al. |
| 2002/0122544 A1 | 9/2002 | Williams et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0137472 A1 | 9/2002 | Quinn et al. |
| 2002/0156699 A1 | 10/2002 | Gray et al. |
| 2002/0165732 A1 | 11/2002 | Ezzeddine et al. |
| 2002/0169606 A1 | 11/2002 | Bantz et al. |
| 2002/0178005 A1 | 11/2002 | Dusan et al. |
| 2002/0181442 A1 | 12/2002 | Rajani |
| 2002/0196277 A1 | 12/2002 | Bushey et al. |
| 2002/0198714 A1 | 12/2002 | Zhou |
| 2003/0003900 A1 | 1/2003 | Goss et al. |
| 2003/0007620 A1 * | 1/2003 | Elsey et al. ............. 379/218.01 |
| 2003/0009339 A1 | 1/2003 | Yuen et al. |
| 2003/0018659 A1 | 1/2003 | Fuks et al. |
| 2003/0026409 A1 | 2/2003 | Bushey et al. |
| 2003/0028498 A1 | 2/2003 | Hayes-Roth |
| 2003/0035381 A1 | 2/2003 | Chen et al. |
| 2003/0035516 A1 | 2/2003 | Guedalia |
| 2003/0039242 A1 | 2/2003 | Moore, Jr. |
| 2003/0048195 A1 | 3/2003 | Trossen |
| 2003/0064720 A1 | 4/2003 | Valins et al. |
| 2003/0069937 A1 | 4/2003 | Khouri et al. |
| 2003/0092451 A1 | 5/2003 | Holloway et al. |
| 2003/0095651 A1 | 5/2003 | Book et al. |
| 2003/0097428 A1 | 5/2003 | Afkhami et al. |
| 2003/0103619 A1 | 6/2003 | Brown et al. |
| 2003/0112956 A1 | 6/2003 | Brown et al. |
| 2003/0114105 A1 | 6/2003 | Haller et al. |
| 2003/0115289 A1 | 6/2003 | Chinn et al. |
| 2003/0118159 A1 | 6/2003 | Shen et al. |
| 2003/0125075 A1 | 7/2003 | Klovborg |
| 2003/0130841 A1 | 7/2003 | Bangalore et al. |
| 2003/0130864 A1 | 7/2003 | Ho et al. |
| 2003/0133421 A1 | 7/2003 | Sundar et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0179876 A1 | 9/2003 | Fox et al. |
| 2003/0181202 A1 | 9/2003 | Link, II et al. |
| 2003/0187632 A1 | 10/2003 | Menich |
| 2003/0187732 A1 | 10/2003 | Seta |
| 2003/0187773 A1 | 10/2003 | Santos et al. |
| 2003/0191648 A1 | 10/2003 | Knott et al. |
| 2003/0194063 A1 | 10/2003 | Martin et al. |
| 2003/0195753 A1 | 10/2003 | Homuth |
| 2003/0200298 A1 | 10/2003 | Su et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0212558 A1 | 11/2003 | Matula |
| 2003/0228007 A1 | 12/2003 | Kurosaki |
| 2003/0235282 A1 | 12/2003 | Sichelman et al. |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0018774 A1 | 1/2004 | Long et al. |
| 2004/0028213 A1 | 2/2004 | Goss |
| 2004/0030649 A1 | 2/2004 | Nelson et al. |
| 2004/0032484 A1 | 2/2004 | Halttunen |
| 2004/0032862 A1 | 2/2004 | Schoeneberger et al. |
| 2004/0032935 A1 | 2/2004 | Mills et al. |
| 2004/0037401 A1 | 2/2004 | Dow et al. |
| 2004/0042592 A1 | 3/2004 | Knott et al. |
| 2004/0044950 A1 | 3/2004 | Mills et al. |
| 2004/0047453 A1 | 3/2004 | Fraser |
| 2004/0063094 A1 * | 4/2004 | Silberstein et al. ........... 455/410 |
| 2004/0066401 A1 | 4/2004 | Bushey et al. |
| 2004/0066416 A1 | 4/2004 | Knott et al. |
| 2004/0066776 A1 | 4/2004 | Ishidoshiro |
| 2004/0072544 A1 | 4/2004 | Alexis |
| 2004/0073569 A1 | 4/2004 | Knott et al. |
| 2004/0083206 A1 | 4/2004 | Wu et al. |
| 2004/0083479 A1 | 4/2004 | Bondarenko et al. |

| | | |
|---|---|---|
| 2004/0088285 A1 | 5/2004 | Martin et al. |
| 2004/0101127 A1 | 5/2004 | Dezonno et al. |
| 2004/0103017 A1 | 5/2004 | Reed et al. |
| 2004/0109555 A1 | 6/2004 | Williams |
| 2004/0111479 A1 | 6/2004 | Borden et al. |
| 2004/0116073 A1 | 6/2004 | Mauney et al. |
| 2004/0120473 A1 | 6/2004 | Birch et al. |
| 2004/0120492 A1 | 6/2004 | Lew et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0127241 A1 | 7/2004 | Shostak |
| 2004/0128624 A1 | 7/2004 | Arellano et al. |
| 2004/0156491 A1 | 8/2004 | Reding et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0162724 A1 | 8/2004 | Hill et al. |
| 2004/0174980 A1 | 9/2004 | Knott et al. |
| 2004/0199394 A1 | 10/2004 | Kuzunuki et al. |
| 2004/0203374 A1 | 10/2004 | Zilliacus |
| 2004/0204056 A1 | 10/2004 | Phelps, III |
| 2004/0213212 A1 | 10/2004 | Reding et al. |
| 2004/0230438 A1 | 11/2004 | Pasquale et al. |
| 2004/0230506 A1 | 11/2004 | Casco-Arias et al. |
| 2004/0240635 A1 | 12/2004 | Bushey et al. |
| 2004/0243568 A1 | 12/2004 | Wang et al. |
| 2004/0259541 A1 | 12/2004 | Hicks, III et al. |
| 2004/0264677 A1 | 12/2004 | Horvitz et al. |
| 2004/0266425 A1 | 12/2004 | Gonsalves et al. |
| 2005/0008141 A1 | 1/2005 | Kortum et al. |
| 2005/0015197 A1 | 1/2005 | Ohtsuji et al. |
| 2005/0015744 A1 | 1/2005 | Bushey et al. |
| 2005/0018825 A1 | 1/2005 | Ho |
| 2005/0020236 A1 | 1/2005 | Mauney et al. |
| 2005/0027535 A1 | 2/2005 | Martin et al. |
| 2005/0032475 A1 | 2/2005 | Mauney et al. |
| 2005/0041647 A1 | 2/2005 | Stinnie |
| 2005/0041796 A1 | 2/2005 | Joseph et al. |
| 2005/0047578 A1 | 3/2005 | Knott et al. |
| 2005/0054335 A1 | 3/2005 | Pearson et al. |
| 2005/0055216 A1 | 3/2005 | Bushey et al. |
| 2005/0058264 A1 | 3/2005 | Joseph et al. |
| 2005/0060200 A1 | 3/2005 | Kobylevsky et al. |
| 2005/0063360 A1 | 3/2005 | Lowmaster |
| 2005/0063528 A1 | 3/2005 | Pearson et al. |
| 2005/0064853 A1 | 3/2005 | Radpour |
| 2005/0064855 A1 | 3/2005 | Russell |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0096024 A1 | 5/2005 | Bicker et al. |
| 2005/0111653 A1 | 5/2005 | Joyce et al. |
| 2005/0113077 A1 | 5/2005 | Bushnell et al. |
| 2005/0131708 A1 | 6/2005 | Palma et al. |
| 2005/0131892 A1 | 6/2005 | Knott et al. |
| 2005/0132262 A1 | 6/2005 | Bushey et al. |
| 2005/0135575 A1 | 6/2005 | Haskey et al. |
| 2005/0135595 A1 | 6/2005 | Bushey et al. |
| 2005/0141479 A1 | 6/2005 | Ozugur et al. |
| 2005/0141692 A1 | 6/2005 | Scherer et al. |
| 2005/0147218 A1 | 7/2005 | Novack et al. |
| 2005/0152531 A1 | 7/2005 | Hamilton, II et al. |
| 2005/0169441 A1 | 8/2005 | Yacoub et al. |
| 2005/0169453 A1 | 8/2005 | Knott et al. |
| 2005/0171877 A1 | 8/2005 | Weiss |
| 2005/0172033 A1 | 8/2005 | Mathew et al. |
| 2005/0172148 A1 | 8/2005 | Ying |
| 2005/0201531 A1 | 9/2005 | Kanter et al. |
| 2005/0201547 A1 | 9/2005 | Burg et al. |
| 2005/0210101 A1 | 9/2005 | Janik |
| 2005/0210143 A1 | 9/2005 | Wengrovitz |
| 2005/0213743 A1 | 9/2005 | Huet et al. |
| 2005/0240411 A1 | 10/2005 | Yacoub |
| 2005/0254632 A1 | 11/2005 | Pasquale et al. |
| 2005/0273781 A1 | 12/2005 | Nakamura et al. |
| 2005/0277431 A1 | 12/2005 | White |
| 2005/0278655 A1 | 12/2005 | Sims et al. |
| 2005/0282582 A1 | 12/2005 | Slotznick |
| 2005/0288927 A1 | 12/2005 | Kim et al. |
| 2006/0003806 A1 | 1/2006 | Weber et al. |
| 2006/0018443 A1 | 1/2006 | Knott et al. |
| 2006/0023863 A1 | 2/2006 | Joseph et al. |
| 2006/0025995 A1 | 2/2006 | Erhart et al. |
| 2006/0026049 A1 | 2/2006 | Joseph et al. |
| 2006/0031587 A1 | 2/2006 | Paterson et al. |
| 2006/0036437 A1 | 2/2006 | Bushey et al. |
| 2006/0039547 A1 | 2/2006 | Klein et al. |
| 2006/0050865 A1 | 3/2006 | Kortum et al. |
| 2006/0056406 A1 | 3/2006 | Bouchard et al. |
| 2006/0062375 A1 | 3/2006 | Pasquale et al. |
| 2006/0072737 A1 | 4/2006 | Paden et al. |
| 2006/0073013 A1 | 4/2006 | Emigholz et al. |
| 2006/0083357 A1 | 4/2006 | Howell et al. |
| 2006/0093097 A1 | 5/2006 | Chang |
| 2006/0100998 A1 | 5/2006 | Edwards et al. |
| 2006/0109974 A1 | 5/2006 | Paden et al. |
| 2006/0109976 A1 | 5/2006 | Sundaram et al. |
| 2006/0115070 A1 | 6/2006 | Bushey et al. |
| 2006/0126808 A1 | 6/2006 | Dallessandro et al. |
| 2006/0126811 A1 | 6/2006 | Bushey et al. |
| 2006/0133587 A1 | 6/2006 | Bushey et al. |
| 2006/0153345 A1 | 7/2006 | Bushey et al. |
| 2006/0159116 A1 | 7/2006 | Gerszberg et al. |
| 2006/0159240 A1 | 7/2006 | Bushey et al. |
| 2006/0161431 A1 | 7/2006 | Bushey et al. |
| 2006/0165066 A1 | 7/2006 | Campbell et al. |
| 2006/0176824 A1 | 8/2006 | Laver et al. |
| 2006/0177040 A1 | 8/2006 | Mitra |
| 2006/0182252 A1 | 8/2006 | Harris et al. |
| 2006/0187954 A1 | 8/2006 | Braschi et al. |
| 2006/0188075 A1 | 8/2006 | Peterson |
| 2006/0188087 A1 | 8/2006 | Kortum et al. |
| 2006/0190424 A1 | 8/2006 | Beale et al. |
| 2006/0195312 A1 | 8/2006 | Knight et al. |
| 2006/0198505 A1 | 9/2006 | Kortum et al. |
| 2006/0215831 A1 | 9/2006 | Knott et al. |
| 2006/0215833 A1 | 9/2006 | Mahoney et al. |
| 2006/0251094 A1 | 11/2006 | Van Vleck et al. |
| 2006/0251229 A1 | 11/2006 | Gorti et al. |
| 2006/0256932 A1 | 11/2006 | Bushey et al. |
| 2006/0256952 A1 | 11/2006 | Rogers et al. |
| 2006/0256956 A1 | 11/2006 | Lee et al. |
| 2006/0285535 A1 | 12/2006 | Metcalf et al. |
| 2006/0291642 A1 | 12/2006 | Bushey et al. |
| 2007/0019800 A1 | 1/2007 | Bushey et al. |
| 2007/0025528 A1 | 2/2007 | Knott et al. |
| 2007/0025542 A1 | 2/2007 | Bushey et al. |
| 2007/0041551 A1 | 2/2007 | Whitecotten et al. |
| 2007/0047718 A1 | 3/2007 | Idler et al. |
| 2007/0047720 A1 | 3/2007 | Brandt et al. |
| 2007/0047728 A1 | 3/2007 | Raju et al. |
| 2007/0116230 A1 | 5/2007 | Brandt et al. |
| 2007/0136060 A1 | 6/2007 | Hennecke et al. |
| 2007/0206734 A1 | 9/2007 | Hagale et al. |
| 2007/0206772 A1 | 9/2007 | Sato et al. |
| 2007/0260539 A1 | 11/2007 | Delinsky et al. |
| 2008/0008308 A1 | 1/2008 | Knott et al. |
| 2008/0048861 A1 | 2/2008 | Naidoo et al. |
| 2008/0049779 A1 | 2/2008 | Hopmann et al. |
| 2008/0154601 A1 | 6/2008 | Stifelman et al. |
| 2008/0154773 A1 | 6/2008 | Ranzini et al. |
| 2008/0273687 A1 | 11/2008 | Knott et al. |
| 2009/0019141 A1 | 1/2009 | Bush et al. |
| 2009/0171799 A1 | 7/2009 | Ying |

FOREIGN PATENT DOCUMENTS

| | | |
|---|---|---|
| EP | 0424015 A3 | 4/1991 |
| EP | 0671859 A2 | 9/1995 |
| EP | 0424015 B1 | 3/1996 |
| EP | 0713345 A2 | 5/1996 |
| EP | 0876652 A4 | 6/1999 |
| GB | 2305078 A | 3/1997 |
| JP | 08-163646 | 6/1996 |
| JP | 08-172673 | 7/1996 |
| JP | 08-294168 | 11/1996 |
| JP | 08-294170 | 11/1996 |

| | | |
|---|---|---|
| JP | 08-317468 | 11/1996 |
| JP | 08-322087 | 12/1996 |
| JP | 09-037345 | 2/1997 |
| JP | 09-055981 | 2/1997 |
| JP | 09-084117 | 3/1997 |
| JP | 09-098476 | 4/1997 |
| WO | 9405101 | 3/1994 |
| WO | 9726612 | 7/1997 |
| WO | 0137539 A2 | 5/2001 |
| WO | 0137539 A3 | 5/2001 |
| WO | 2004017584 A1 | 2/2004 |
| WO | 2004049222 A2 | 6/2004 |

OTHER PUBLICATIONS

International Search Report and Written Opinion of the International Searching Authority for International Application No. PCT/US06/28349, Mailed on Aug. 13, 2007, 5 pages.

International Search Report and Written Opinion of the International Searching Authority for International Application No. PCT/US04/34239, Mailed on Feb. 17, 2005, 7 pages.

International Search Report and Written Opinion of the International Searching Authority for International Application No. PCT/US05/16449, Mailed on Apr. 10, 2006, 7 pages.

International Search Report and Written Opinion of the International Searching Authority for International Application No. PCT/US04/16017, Mailed on Aug. 16, 2005, 5 pages.

International Search Report and Written Opinion of the International Searching Authority for International Application No. PCT/US04/28260, Mailed on Sep. 30, 2005, 7 pages.

Charny, Ben, "VoIP phone maker plans a cell hybrid," CNET News.com, <http://news.cnet.com/2100-7352_3-5086177.html> Oct. 3, 2003, 2 pages.

Duder, John C., et al., "Towards 'zero abandonments' in call center performance," European Journal of Operational Research, 2001 Elsevier Science B.V., pp. 50-56.

Haartsen, Jaap C., "BLUETOOTH: A new radio interface providing ubiquitous connectivity," IEEE, 2000, pp. 107-111.

Lind, Patric, ed., "Specification of the Bluetooth System: Profiles," v1.0 B, Dec. 1, 1999, Bluetooth Consortium, 57 pages.

Ogino, Tsukasa, et al., "Technologies for Internet Infrastructure: Eliminating the World Wide Wait," iNet Japan, <http://www.isoc.org/inet2000/cdproceedings/1g/index.htm>, Jul. 18-21, 2000, 19 pages.

Schneiderman, Ron, ed., "Bluetooth's slow dawn," IEEE Spectrum, Nov. 2000, pp. 61-65.

Yahoo! <http:web.archive.org/web/19981212034238/http://www.yahoo.com/> as archived in the Internet Archive Dec. 12, 1998, 1 page.

Yahoo! Arts <http://web.archive.org/web/19980630074227/www.yahoo.com/Arts/> retrieved Mar. 7, 2007, 1 page.

\* cited by examiner

CALL ROUTING SYSTEM AND METHOD OF USING THE SAME

PRIORITY CLAIM

This application is a continuation of, and claims priority from, U.S. patent application Ser. No. 11/144,375, now U.S. Pat. No. 7,657,020, filed Jun. 3, 2005 and entitled "CALL ROUTING SYSTEM AND METHOD OF USING THE SAME," which is hereby incorporated by reference in its entirety.

FIELD OF THE DISCLOSURE

The present disclosure relates to call routing systems, and more particularly to methods, data processing systems, and data processing system readable media for use in call routing systems.

BACKGROUND

Many businesses use call service centers as a way to conduct business with their customers. Operating a call service center can be expensive, particularly, if an attendant needs to interact with every or nearly every caller. Automating call service centers typically includes using a call routing system. Insufficient information may be provided to a call routing system. If insufficient information is provided, a call may be routed to an improper destination, or the call may need to be manually dispositioned by an attendant. The former can be problematic because it can increase the caller's frustration with the call service center and may result in potential lost revenue. The latter can be problematic because the purpose of automating is to reduce having calls, that could otherwise be properly routed, manually dispositioned by an attendant.

Skilled artisans will appreciate that elements in the figures are illustrated for simplicity and clarity and have not necessarily been drawn to scale.

DETAILED DESCRIPTION

A call routing system can be used to route calls. An action object identifier, a result identifier, and a reason identifier can be generated in response to a call. The call can be routed by the call routing system based at least in part on the action object identifier, the result identifier, and the reason identifier. The routing can be performed automatically without requiring an attendant. The use of the action object identifier, the result identifier, and the reason identifier may improve accuracy when routing a call to reduce caller frustration with the call routing system. In another embodiment, an attendant can be used, if desired. In still another embodiment, the processing of the call can be interrupted by the caller, by a data processing system used with the call routing system, or by an attendant. In a particular embodiment, the call routing system can be used when authenticating a caller or determining an account status of the caller. As described herein, the call routing system is highly flexible and can be tailored to the needs or desires of an entity that controls the call routing system.

In a first aspect, a method of using a call routing system can include generating an action object identifier, a result identifier, and a reason identifier at a first module in response to a call. The method can also include routing the call from the first module to a second module based at least in part on the action object identifier, the result identifier, and the reason identifier.

In a second aspect, a data processing system can be used in call routing. The data processing system can include a first module configured to generate an action object identifier, a result identifier, and a reason identifier in response at least in part to a received call. The data processing system can also include a routing module configured to route the received call from the first module to a second module based at least in part on the action object identifier, the result identifier, and first reason identifier.

In a third aspect, a data processing system readable medium can have data to be used with a call routing system, wherein the data is embodied within the data processing system readable medium. The data can include instructions to generate an action object identifier, a result identifier, and a reason identifier at a first module in response to a call. The data can also include instructions to route the call from the first module to a second module based at least in part on the action object identifier, the result identifier, and the reason identifier.

In one embodiment, the action object identifier can be associated with a task that is being or was at least partially performed. In another embodiment, the result identifier can be associated with the task and has a value that indicates whether the task was successful or unsuccessful. In still another embodiment, the reason identifier can include information regarding why the task was determined to be successful or unsuccessful.

In a particular embodiment, a method of using a call routing system includes generating a first action object identifier associated with a task, a first result identifier associated with the task and having a value that indicates a status of the task, and a first reason identifier that includes information related to the first result identifier at a first module in response at least in part to a call using a processor of the call routing system. The method further includes routing the call from the first module to a second module using the processor, based at least in part on the first action object identifier, the first result identifier, and the first reason identifier.

In a particular embodiment, a data processing system includes a processor and a memory coupled to the processor. The data processing system further includes a first module in the memory. The first module is executable by the processor to generate, in response to a received call, a first action object identifier associated with a task, a first result identifier associated with the task and having a value that indicates a status of the task, and a first reason identifier that includes information related to the first result identifier. The data processing system further includes a routing module in the memory. The routing module is executable by the processor to route the received call from the first module to a second module based at least in part on the first action object identifier, the first result identifier, and the first reason identifier.

In a particular embodiment, a data processing system readable medium includes data to be used with a call routing system. The data is embodied within the data processing system readable medium. The data includes instructions to generate a first action object identifier associated with a task, a first result identifier associated with the task and having a value that indicates a status of the task, and a first reason identifier that includes information related to the first result identifier at a first module in response at least in part to a call. The data also includes instructions to route the call from the first module to a second module based at least in part on the first action object identifier, the first result identifier, and the first reason identifier.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, for clarity purposes and to give a general sense of the scope of the embodiments described herein, the use of "a" or "an" are employed to describe one or more articles to which "a" or "an" refers. Therefore, the description should be read to include at least one whenever "a" or "an" is used, and the singular also includes the plural unless it is clear that the contrary is meant otherwise.

Unless stated otherwise, any combination of parts of a system may be bi-directionally or uni-directionally coupled to each other, even though a figure may illustrate only a single-headed arrow or a double-headed arrow. Arrows within the drawing are illustrated, as a matter of convenience, to show a principal information, data, or signal flow within the system or between the system and one or more components outside the system, one or more modules outside the system, another system, or any combination thereof in accordance with an embodiment. Coupling should be construed to include a direct electrical connection in one embodiment and alternatively, may include any one or more of an intervening switch, resistor, capacitor, inductor, router, firewall, network fabric or the like between any combination of one or more components, one or more devices, or one or more modules.

Unless otherwise defined, technical and scientific terms used herein have the same meaning as commonly understood by one of ordinary skill in the art. In addition, the methods and examples disclosed are illustrative only and not intended to be limiting.

Figure 1:
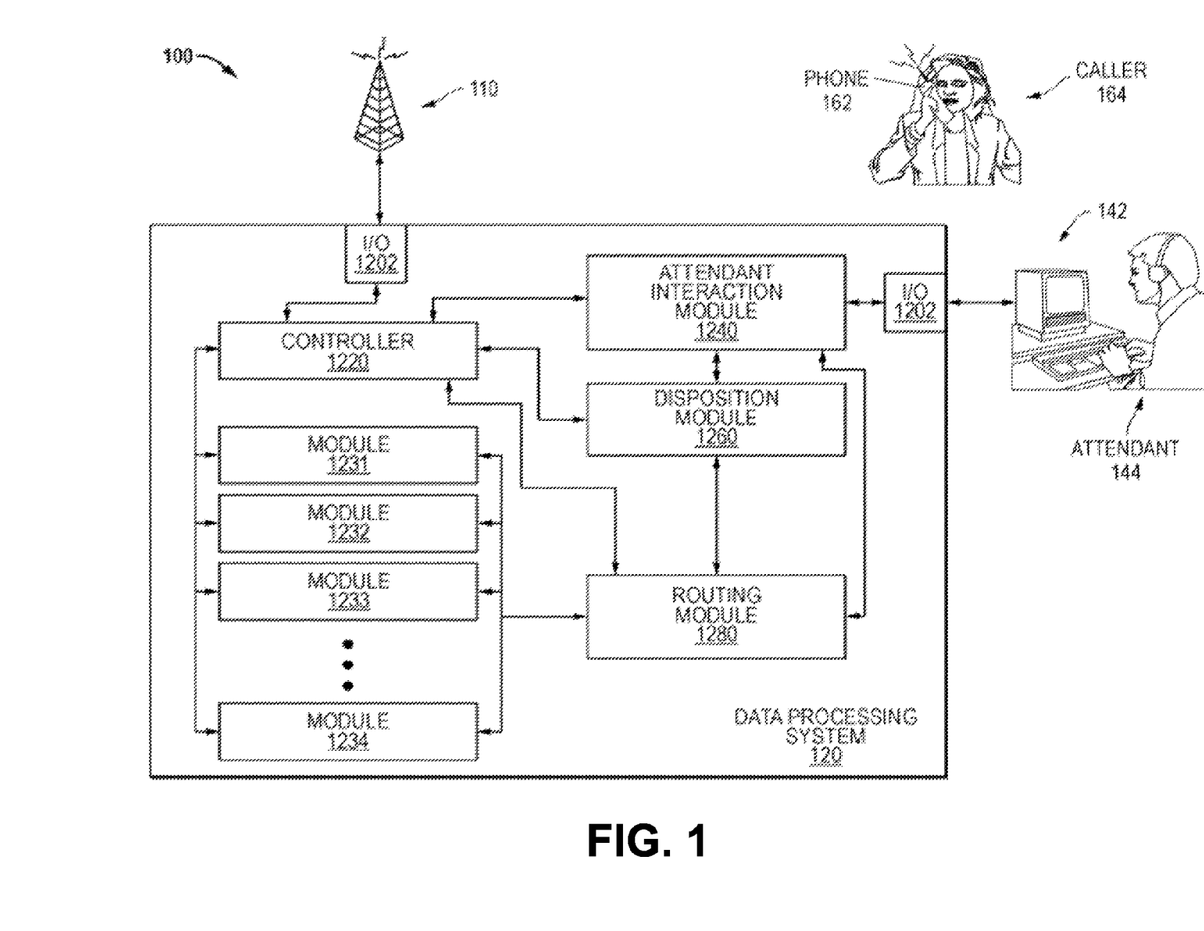
FIG. 1 includes a general diagram of a caller at a phone using a call service center including a call routing system.

FIG. 1 includes a general diagram of a caller using a call service center 100. The call service center 100 can receive a call from a caller that allows the caller to obtain information, products, or services, potentially without using an attendant. Thus, the call service center 100 can be used by a wide variety of businesses including manufactures, retailers, distributors, telephone service providers, airlines, etc. The call service center 100 can be designed as described herein to help to automate routing of calls within the call service center 100 while still allowing a human attendant to interact with the caller to reduce caller frustration, reduce the likelihood that the caller, who may intend on purchasing a product or service, leaves without successfully making the purchase, etc. After reading this specification, skilled artisans will appreciate that the architectures and methods described herein are highly flexible and can be adapted to the need or desires of the entity using a call service center.

The call service center 100 can include a data processing system 120 that is bi-directionally coupled to an antenna 110 and an attendant terminal 142. In another embodiment, the antenna 110 is not used, particularly if the phone 162 is a wireline phone, rather than a wireless phone as illustrated in FIG. 1. An attendant 144 can be present at the attendant terminal 142. A caller 164 can use a phone 162 to call the call service center 100 and transact business with the entity operating the call service center 100. The call includes speech of the caller 164 that may be received by the call service center 100. The caller 164 may or may not speak during the call. In one embodiment, the phone 162 is communicatively coupled to the data processing system 120, via the antenna 110. The phone 162 can include a wireline phone or a wireless phone. The phone 162 can include a conventional telephone, a cell phone, a voice over Internet protocol phone, or the like. Wires, switches, routers, or potentially other equipment (not illustrated) may be used to communicatively couple the phone 162 to the data processing system 120.

The data processing system 120 can be part of or include a call routing system, as described herein. Each of the antenna 110 and attendant terminal 142 can be coupled to the data processing system 120 through one or more input/output ("I/O") ports 1202. In another embodiment, separate input ports and output ports could be used. For simplicity, I/O ports collectively refer to any or all of input ports, output ports or input/output ports. The data processing system 120 further comprises a controller 1220 that is bi-directionally coupled to modules that are designed to perform actions as requested by a caller using the call service center 100. In the embodiment as illustrated in FIG. 1, the controller 1220 is bi-directionally coupled to module 1231, module 1232, module 1233, and module 1234. Each of the modules 1231 through 1234 can perform one or more actions at the call service center 100. Such actions can include authenticating caller 164, determining account status or other account information of the caller 164, providing information regarding products or services of the entity operation the call service center 100, allowing the caller 164 to purchase products or services at the call service center 100, perform other suitable action, or any combination thereof. More or fewer modules may be used.

The controller 1220 is also bi-directionally coupled to an attendant interaction module 1240, a disposition module 1260, and a routing module 1280. The attendant interaction module 1240 can allow an input signal from the attendant terminal 142 to be received when the attendant 144 is servicing a call. The attendant interaction module 1240 is bi-directionally coupled to the disposition module 1260 and the routing module 1280. The disposition module 1260 can receive an attendant interaction signal from the attendant interaction module 1240 or a signal from the controller 1220 in order to generate a disposition signal at the disposition module 1260 in order to disposition a call. The disposition module is bi-directionally coupled to the routing module 1280. The routing module 1280 may receive signals from the controller 1220, the attendant interaction module 1240, the disposition module 1260, any one or more of the modules 1231 through 1234, or any combination thereof in order to route the call to an appropriate module when servicing the call.

Although not illustrated, other connections and memories may reside in or be coupled to the data processing system 120. Such memories can include a hard disk, content addressable memory, static random access memory, cache, first-in-first-out ("FIFO"), a database, a storage network, other memories, or any combination thereof. The memories can include media that can be read by the data processing system 120. Therefore, each of the types of memory includes a data processing system readable medium.

Portions of the methods described herein may be implemented in suitable software code or other data for carrying out the methods described. In one embodiment, computer-executable instructions may be lines of assembly code or compiled C++, Java, or other language code. In another embodiment, the code may be contained on a data storage device, such as a hard disk, magnetic tape, floppy diskette, optical storage device, networked storage device(s), or other appropriate data processing system readable medium or storage device.

Functions performed by any one or more of the modules may be combined with one or more other modules or the controller 1220. For example, the disposition module 1260 and the routing module 1280 may be combined into a single module. In still another embodiment, one or more of the modules may be located outside of the data processing system 120. For example, the attendant interaction module 1240 could reside in the attendant terminal 142. Further, more than one type of module may reside in one or more devices. For example, a disposition module may reside within the phone 162, the attendant terminal 142, or both in addition to or in place of the disposition module 1280 within the data processing system 120. Such disposition modules may be substantially the same or different when compared to each other. Also, any single module may be embedded within a plurality of integrated circuits, chip sets, circuit boards, or the like. Additionally, a software program or its software components with such code may be embodied in more than one data processing system readable medium in more than one computer or other item having a controller or a processor.

Figure 2:
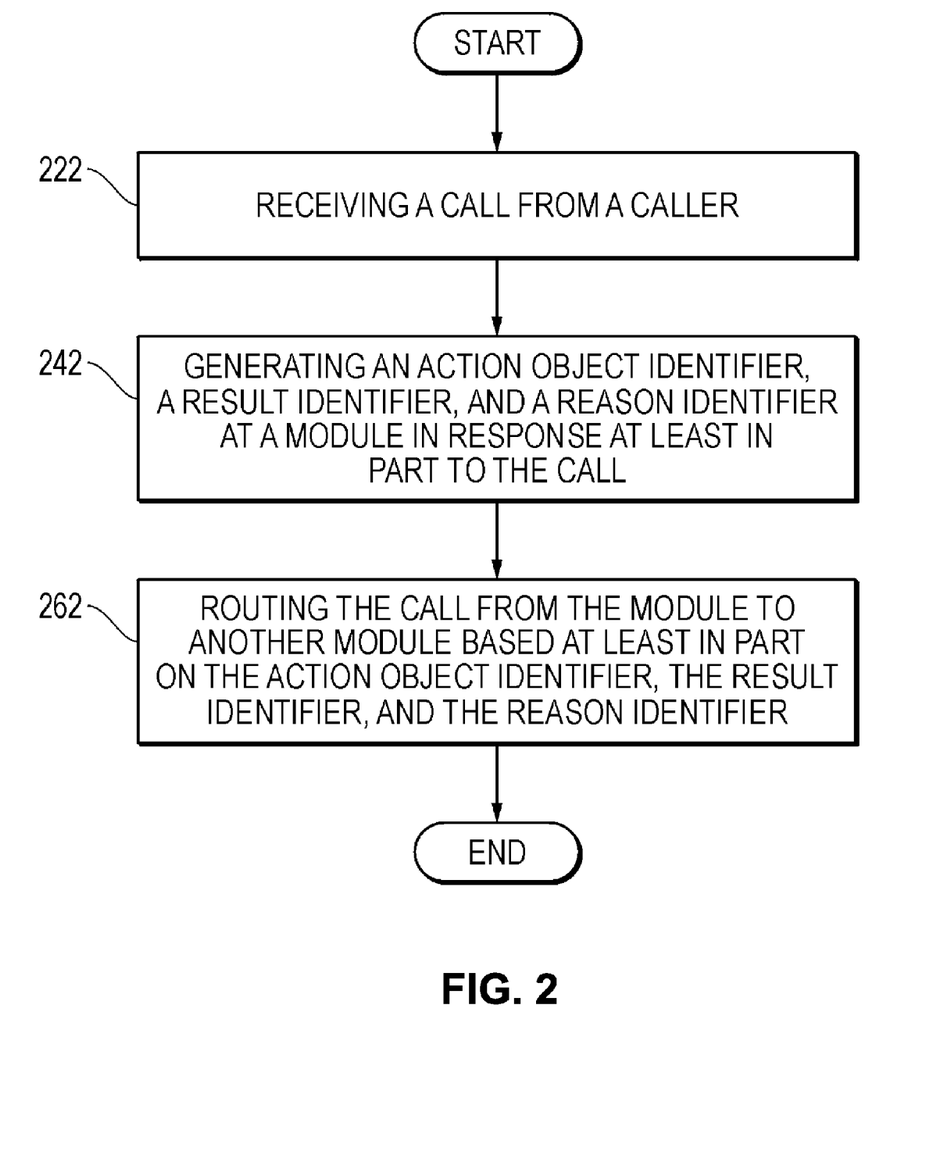
FIG. 2 is a flow diagram of a method of using a call routing system.

Attention is now directed toward a method of using a call routing system for the call service center 100 in accordance with an embodiment, as illustrated in FIG. 2. The method can include receiving a call from the caller 164, at block 222. The method can also include generating an action object identifier, a result identifier, and a reason identifier at a module in response at least in part to the call, at block 242.

In one embodiment, the action object identifier can be associated with a task that is being or was at least partially performed. In another embodiment, the result identifier can be associated with the task and has a value that indicates whether the task was successful or unsuccessful. In still another embodiment, the reason identifier can include information regarding why the task was determined to be successful or unsuccessful.

The method can further include routing the call from the module to another module based at least in part upon the action object identifier, the result identifier, and the reason identifier, at block 262. Some details regarding the operations performed as described in blocks 242 and 262 are described with respect to exemplary, non-limiting embodiments, as illustrated in FIGS. 3 through 6. Occasional references will be made to the call service center, as illustrated in FIG. 1, when describing methods as illustrated in FIGS. 3 through 6.

Figure 3:
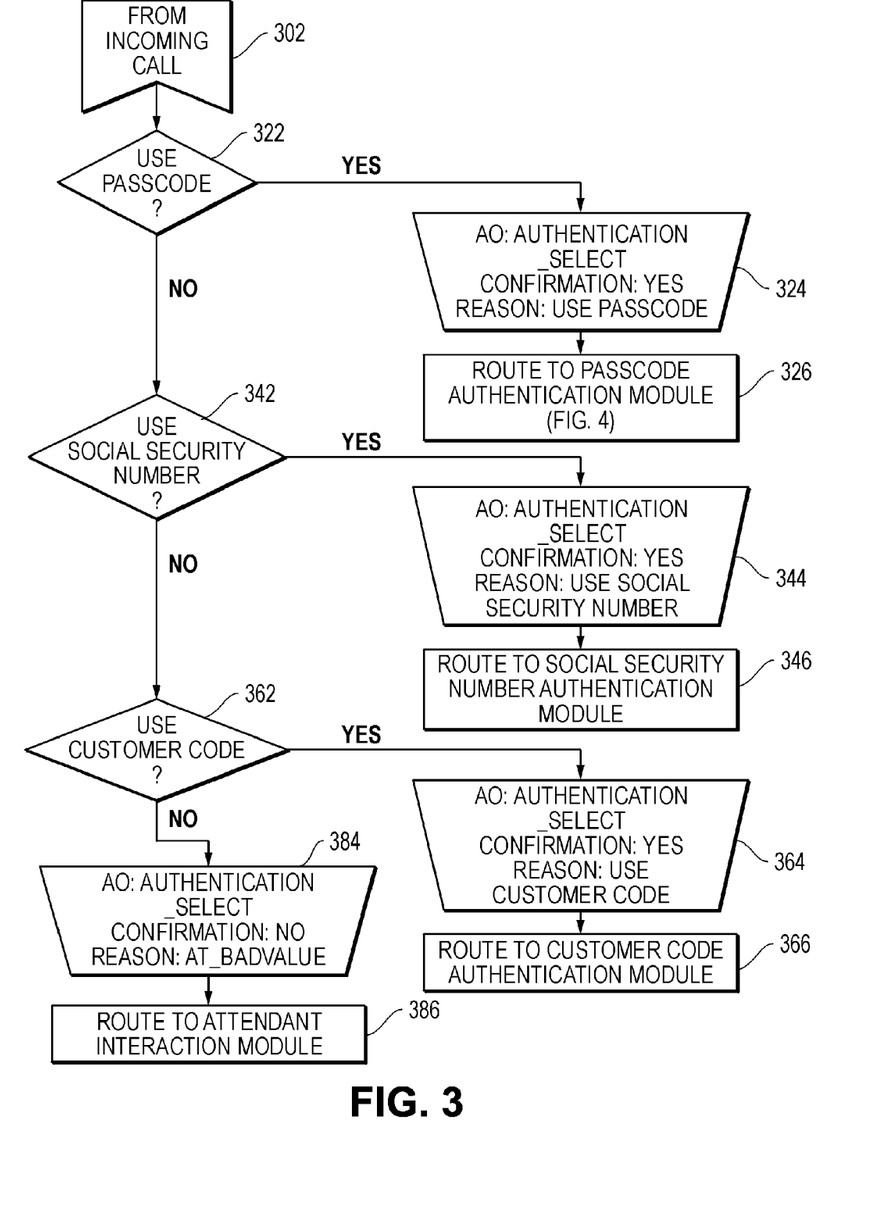
FIGS. 3 and 4 include flow diagrams of a method of authenticating a caller using the call service center of FIG. 1.
Figure 4:
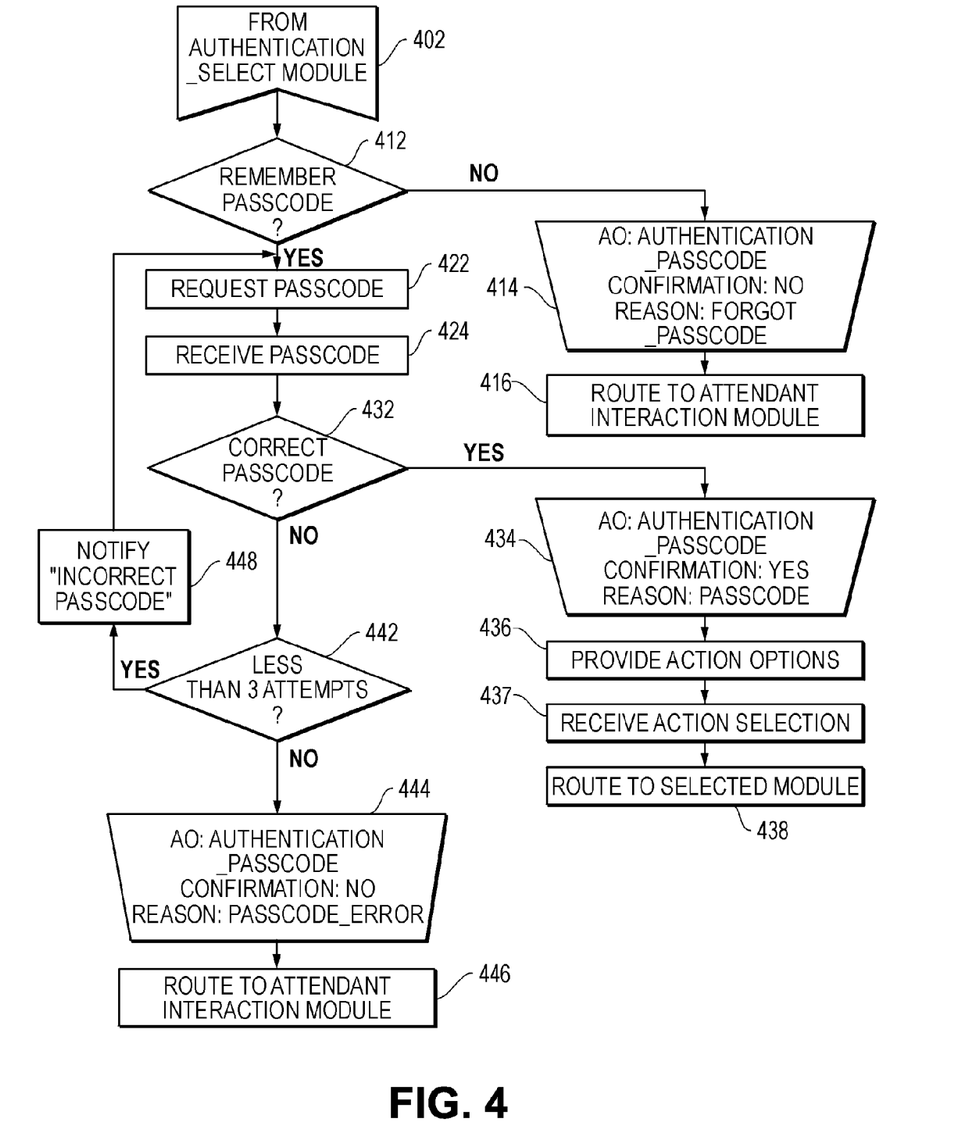

FIGS. 3 and 4 include process flow diagrams that illustrate potential actions that may occur within an authentication-select module and a pass code authentication module. Referring to FIG. 3, signals can be received from an incoming call, such as a call from the caller 164 at phone 162, at item 302. The call can be received at I/O port 1202 of the data processing system 120 via the antenna 110. The signal can be transmitted from the I/O port 1202 to the controller 1220. The controller 1220 may transmit the signals to an authentication-select module that may be module 1231 in FIG. 1. The authentication-select module can be used by the caller 164 to select the type of authentication that he or she desires in order to access his or her account. The transmission from the controller 1220 may be directly from the controller 1220 to the module 1231 or may occur via the routing module 1280.

The method can include determining whether to use a pass code, at decision act 322 in FIG. 3. In one embodiment, the data processing system 120 can generate signals and transmit the signals to the phone 162 instructing the caller 164 to determine whether the pass code should be used for authentication. The caller 164 can activate one or more keys, buttons, or other controls, or any combination thereof of the phone 162 to generate a user input signal that is received by the data processing system 120. If the pass code will be used for authentication, an action object identifier, a result identifier, and a reason identifier can be generated by the authentication-select module. In one embodiment, the action object identifier can include "AO: Authentication_Select," the result identifier can include "Confirmation: Yes," and the reason identifier can include "Reason: Use PassCode," at block 324. The information as illustrated within block 324 can be used by the routing module 1280 to route the call, and optionally route any or all of the information within block 324 associated with the call, to a pass code authentication module, at block 326. Note that the pass code authentication module is a particular example of an authentication module. Referring to the data processing system as illustrated in FIG. 1, the pass code authentication module may be module 1232.

If the pass code will not be used to authenticate the caller 164 ("no" branch from decision act 322 in FIG. 3), the method can include determining whether to use the caller's social security number, at decision act 342. The procedure for determining whether to use the caller's social security number is substantially similar to the process described regarding determining whether to use the pass code. If the caller's social security number will be used for authentication, an action object identifier, a result identifier, and a reason identifier can be generated by the authentication-select module. In one embodiment, the action object identifier can include "AO: Authentication_Select," the result identifier can include "Confirmation: Yes," and the reason identifier can include "Reason: Use SS#," at block 344. The information within block 344 can be used by the routing module 1280 to route the call, and optionally route any or all of the information within block 344 associated with the call, to a social security number authentication module, at block 346.

If the caller's social security number will not be used to authenticate the caller 164 ("no" branch from block 342 in FIG. 3), the method can include determining whether to use the caller's customer code, at decision act 362. The procedure for determining whether to use the caller's customer code is substantially similar to the process used to determine whether to use a pass code. If the caller's customer code will be used for authentication, an action object identifier, a result identifier, and a reason identifier can be generated by the authentication-select module. In one embodiment, the action object identifier can include "AO: Authentication_Select," the result identifier can include "Confirmation: Yes," and the reason identifier can include "Reason: Use CustomerCode," at block 364. The information within block 364 can be used by the routing module 1280 to route the call, and optionally route any or all of the information within block 364 associated with the call, to a customer code authentication module, at block 366.

In one particular embodiment, no other type of authentication is supported by the call service center 100. Therefore, if none of the types of authentication were selected, the caller 164 may be having problems. At this point, the caller may have the attendant 144 help the caller 164 in determining which type of authentication the caller desires, or to otherwise disposition the call. Returning to FIG. 3 ("no" branch from decision act 362), an action object identifier, a result identifier, and a reason identifier can be generated by the authentication-select module. In one embodiment, the action object identifier can include "AO: Authentication_Select," the result identifier can include "Confirmation: No," and the reason identifier can include "Reason: AT_badvalue," at block 384. The information within block 384 can be used by the routing module 1280 to route the call, and optionally route any or all of the information within block 324 associated with the call, to the attendant interaction module 1240, at block 386.

In another embodiment, the action object identifiers generated at the authentication-select module may be different. For example, the action object identifier in block 324 could be "AO: AT_PassCode," the action object identifier in block 324 could be "AO: AT_SS#," or the action object identifier in block 324 could be "AO: AT_CustomerCode." The actual names used are not critical. The controller 1220, routing module 1280, one or more other modules, or any combination thereof, can include logic, such that the module(s) can route the call based at least in part on a particular combination of action object identifier, result identifier, and reason identifier.

In one particular embodiment, the caller 164 may have selected to use the pass code to authenticate. A pass code authentication module will be used to authenticate the caller 164 so that the caller 164 can have access to the caller's account information. Referring to FIG. 4, the call can be transferred to the pass code authentication module from the authentication-select module, as illustrated in item 402. Referring to FIG. 1, the pass code authentication module may be module 1233.

The method can include determining whether the caller 164 can remember the caller's pass code, at decision act 412 in FIG. 4. Referring to FIG. 1, the data processing system 120 can conduct a dialog with the caller 164 via the phone 162 and the antenna 110. The caller 164 can activate one or more keys, buttons, or other controls, or any combination thereof of the phone 162 to generate a user input signal that is received by the data processing system 120. If the caller 164 does not remember his or her pass code, another action object identifier, another result identifier, and another reason identifier can be generated by the pass code authentication module. In one embodiment, the action object identifier, the result identifier, and the reason identifier at block 324 may have been passed with the call. In this embodiment, generating can include changing the action object identifier, the result identifier, and the reason identifier as described with respect to block 324 to the other action object identifier, the other result identifier, and the other reason identifier, at block 414. In another embodiment, the action object identifier, the result identifier, and the reason identifier at block 324 are not passed with the call. In this embodiment, the pass code module can create the other action object identifier, the other result identifier, and the other reason identifier at block 414.

In one particular embodiment, the other action object identifier can include "AO: Authentication_PassCode," the other results identifier can include "Confirmation: No," and the reason identifier can include "Reason: Forgot_Passcode," at block 414. The information within block 414 can be used by the routing module 1280 to route the call, and optionally route any or all of the information within block 414 associated with the call, to the attendant interaction module 1240, at block 416. The attendant 144 at the attendant terminal 142 can interact with the caller 164 at phone 162 to assist the caller 164 in proceeding by manually authenticating the caller 164.

If the caller 164 remembers his or her pass code ("yes" branch from decision act 412 in FIG. 4), the data processing system 120 can transmit a request to the phone 162 to have the caller 164 enter the pass code, at block 422. The caller 164 can enter the pass code into the phone 162 which in turn can generate a user input signal that is transmitted by the phone 162 and received by the data processing system 120, at block 424. The method can further include determining whether the pass code entered is correct, at decision act 432.

If the caller 164 provided the correct pass code, the pass code authentication module can generate an action object identifier, a result identifier, and a reason identifier that reflects the successful authentication using the pass code. In one embodiment, the action object identifier can include "AO: Authentication_PassCode," the results identifier can include "Confirmation: Yes," and the reason identifier can include "Reason: PassCode," at block 434. The caller 164 may be able to continue to use the call service center 100 to conduct business or perform other actions as allowed by the call service center 100. In one particular embodiment, the method can still further include providing action options that can be transmitted from the data processing system 120 to the phone 162, at block 436, receive an action select signal from the phone 162, at block 437, and route the call to the selected module associated with the action select signal, at block 438.

The caller 142 may be allowed up to three attempts to enter the correct pass code. If the pass code is not correct ("no" branch from decision act 432), the method can determine if less than three attempts for the correct pass code has occurred, at decision act 442. If yes, the method can include notifying the caller that an incorrect pass code was received, at block 448. The method can include requesting the pass code, receiving the pass code, and determining if the pass code is correct. After three unsuccessful attempts ("no" branch from decision act 442), an action object identifier, a result identifier, and a reason identifier can be generated by the pass code authentication module. In one embodiment, the action object identifier can include "AO: Authentication_PassCode," the result identifier can include "Confirmation: No," and the reason identifier can include "Reason: Passcode_Error," at block 444. The information at block 444 can be used by the routing module 1280 to route the call, and optionally route any or all of the information associated with the call, to the attendant interaction module 1240, at block 446.

Figure 5:
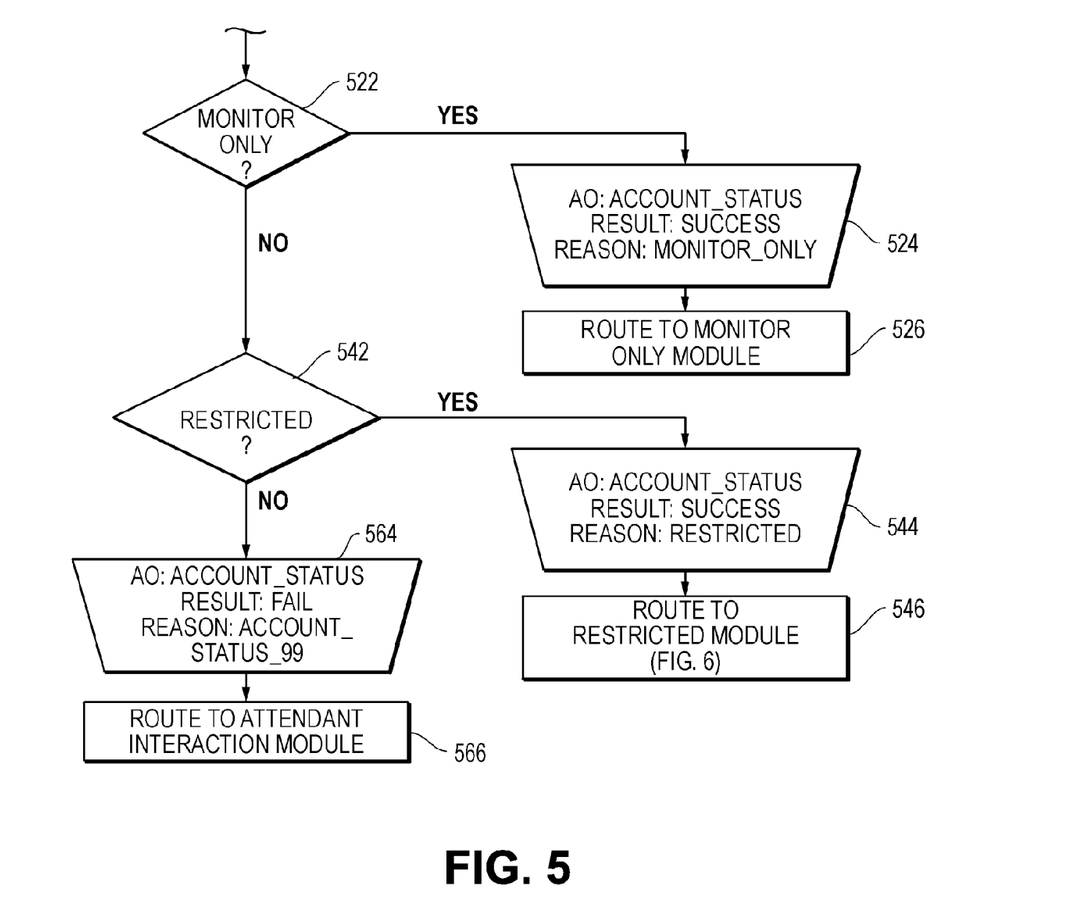
FIGS. 5 and 6 include flow diagrams of a method using a call routing system with a caller having a restricted account using the call service center of FIG. 1.

In another particular embodiment, an account-status module and a restricted-account module can be used by the data processing system 120 when servicing the caller 164 at phone 162. The caller 164 may have initiated a call from the phone 162 that is currently being processed by the data processing system 120. An entity may need to reduce the likelihood that a customer, such as the caller 164 at the phone 162, may exceed a credit limit or otherwise purchase products or services where the likelihood of collecting money from the customer may be difficult or impossible, based at least in part on historic account data. In this particular embodiment, an account-status module can be used to reduce the likelihood of the caller 164 entering into a transaction that should otherwise be avoided or authorized on an ad-hoc basis. Referring to FIG. 5, an account-status module can be used to determine whether the account for the caller 164 is on monitor-only status or restricted status. The account-status module can retrieve account status information for the caller 164 from a database, hard disk, or other storage device (not illustrated).

If the account is on monitor-only status ("yes" branch from decision act 522 in FIG. 5), the account-status module can generate an action object identifier, a result identifier, and a reason identifier that reflects such status information. In one particular embodiment, the action object identifier can include "AO: Account_Status," the result identifier can include "Result: Success," and the reason identifier can include "Reason: Monitor_only," at block 524. The information at block 524 can be used by the routing module 1280 to route the call, and optionally route any or all of the information associated with the call, to a monitor-only module, at block 526.

If the account is not on monitor-only status ("no" branch from decision act 522), the method can include determining whether the account is on restricted status, at decision act 542. The account-status module can use account status information to make the determination. If the caller's account in on restricted status, the account-status module can generate an action object identifier, a result identifier, and a reason identifier that reflects the restricted status. In one particular embodiment, the action object identifier can include "AO: Account_Status," the results identifier can include "Result: Success," and the reason identifier can include "Reason: Restricted," at block 544. The information can be used by the routing module 1280 to route the call, and optionally route any or all of the information associated with the call to a restricted module, at block 546. The restricted module will be described in more detail with respect to FIG. 6.

At this point, the account status may not be able to be determined by the account-status module. The call may require the attendant 144 to determine the account status of the caller. If the account is not on monitor-only or restricted status ("no" branch from decision act 542), the account-status module can generate an action object identifier, a result identifier, and a reason identifier that reflects an indeterminate account status. In one particular embodiment, the action object identifier can include "AO: Account_Status," the results identifier can include "Result: Fail," and the reason identifier can include "Reason: Account_Status99," at 564. In one particular embodiment, the information can be used by the routing module 1280 to route the call, and optionally route any or all of the information associated with the call, to the attendant interaction module 1240, at block 566.

In one embodiment, the caller's account may be on restricted status. As such, the entity operating the call service center 100 may need to limit what the caller 164 purchases or can otherwise limit actions of the caller at the call service center 100. In one particular embodiment, the call and optionally any or all of the associated information can be routed to the restricted module from the account-status module, at item 602 in FIG. 6. Account status information associated with the caller's account may be transmitted from the data processing system 120 to the phone 162 for the caller's use. The transmission can include information, such as credit limit, account balance, estimated fees or costs, any other account information, or any combination thereof. The transmission can also include providing the caller 164 one or more options regarding the call. Block 622 includes one non-limiting example of information that may be transmitted from the data processing system 120 to the phone 162.

Figure 6:
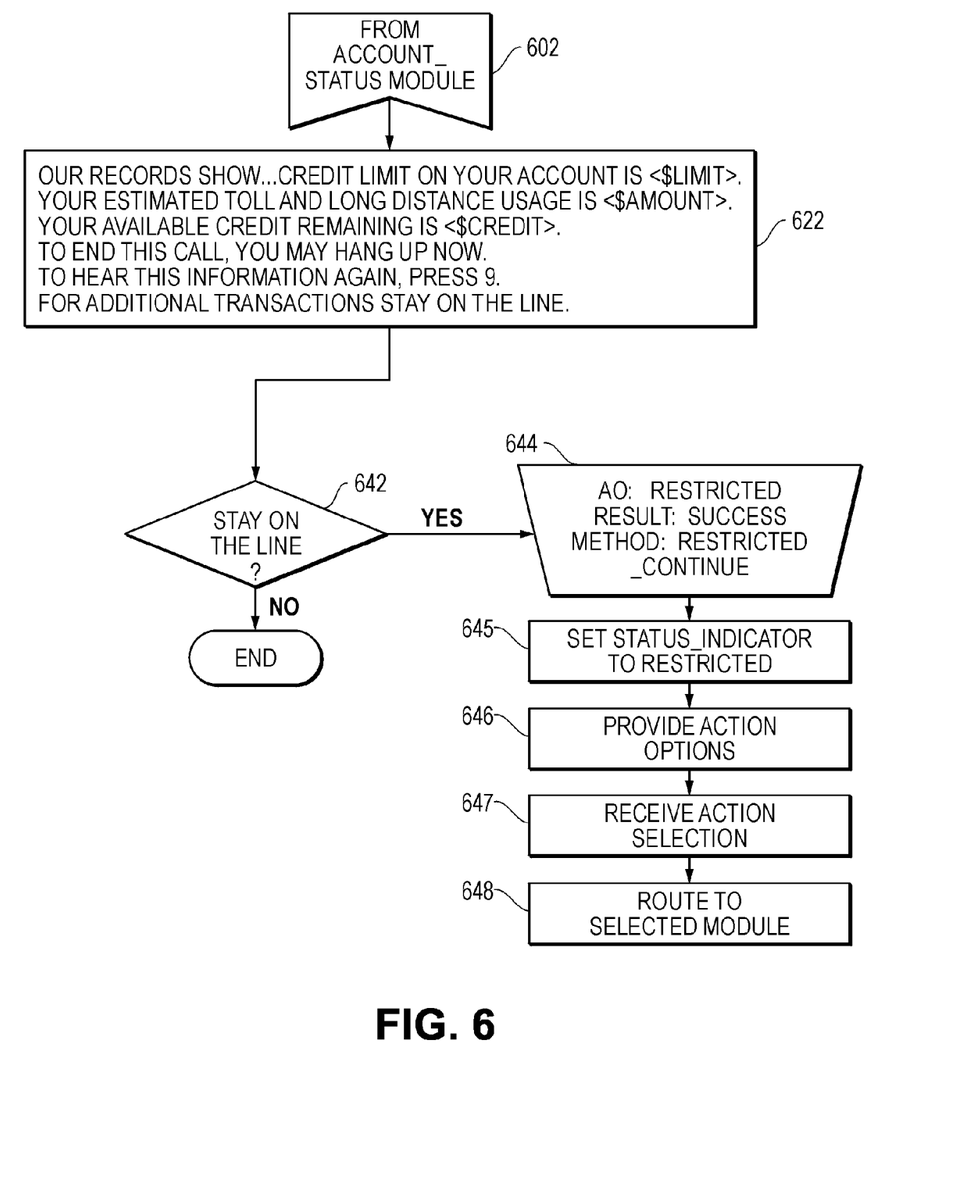

In one particular embodiment, the method can include determining whether the caller 164 desires to stay on the line, at decision act 642 in FIG. 6. If not, the caller 164 can terminate the call. If the caller 164 desires to stay on the line, the data processing system 120 can receive a user input signal corresponding to the caller 164 desiring to stay on the line. The restricted module can generate an action object identifier, a result identifier, and a reason identifier that reflects the restricted status. In one particular embodiment, the action object identifier can include "AO: Restricted," the results identifier can include "Result: Success," and the reason identifier can include "Restricted_Continue," at block 464. The method can further include setting an account status indicator to restricted, at block 645. In one embodiment, the account status indicator may be used to reduce the likelihood that the caller 164 will exceed the caller's credit limit, and in another embodiment, may allow an attendant (e.g., an account representative) to override the credit limit, if desired, later during the call. Referring to FIG. 6, the method can also include providing action options to the caller 164, at block 646, receiving an action selection from the phone 162, at block 647, and route the call to be selected module associated with the selected action, at block 648.

In still another embodiment, the method may be interrupted at potentially nearly any time because the caller 164 made a wrong selection, the attendant 144 may determine that the caller 164 appears to be lost, the controller 1220 may determine that the call has been in a module too long or is causing an infinite loop to be performed by a module, or for another reason. Therefore, an interrupt signal may be generated by the phone 162, the attendant terminal 142, or the data processing system 120. The interrupt signal can be used to at least temporarily stop processing in order for another action to be taken.

For example, the caller 164 may determine that he or she desires to have an attendant 144 service the call. The phone 162 can generate an interrupt signal that is received by the controller 1220 of the data processing system 120. The controller 1220 can then transmit one or more signals to any one or more modules within the data processing system 120. For example, the controller 1220 can instruct the routing module to route the call, and optionally communicate an action object identifier, a result identifier, and a reason identifier with the routed call to the attendant interaction module 1240. The attendant interaction module 1240 can transmit a notice to the attendant terminal 142 for the attendant 144 to service the call. The attendant terminal 142 can then transmit one or more signals to the attendant interaction module 1240 that can generate an attendant interaction signal. The attendant interaction signal can be transmitted to the disposition module 1260, which in turn, can generate a disposition signal that can be transmitted to the routing module 1280. During the process, the call, and optionally the action object identifier, the result identifier, and the reason identifier, can be passed from one module to another module. When the action object identifier, the result identifier, and the reason identifier are passed with the call, the modules within the data processing system 120, or the attendant 144 in the attendant terminal 142, may quickly analyze status information regarding the call without having to access a log file or otherwise retrieve data from storage. By not having to analyze data within a log file or retrieving information from storage, handling of the call at the call service center 100 may be done more quickly and efficiently.

Whenever an action object identifier, a result identifier, a reason identifier, or any combination thereof is generated or used to route a call, such information can be stored within a log file. The log file can be used by the attendant analyzing call data to improve or otherwise change a configuration of the call service center, or for another reason.

The use of the action object identifier, the result identifier, and the reason identifier by a call routing system can allow for more accurate routing of a call within a call service center. The likelihood of inaccurate routing or unnecessary human intervention by an attendant can be significantly reduced. Retrieving a log file or information from a database is not needed in order to use the call routing system as described. Therefore, more accurate automated routing with less human intervention can be achieved with a call routing system.

The call routing system may be used in a wide variety of call service centers. The call service center 100 may be used by manufacturers, retailers, distributors, telephone service providers, airlines, etc. or other businesses that support a customer call center. In one non-limiting embodiment, the call center 100 can include a speech-enabled, self-service call routing system or call service center for performing one or more transactions or obtaining information from the entity that controls the call service center 100.

Note that not all of the activities described above in the general description or the examples are required, that a portion of a specific activity may not be required, and that one or more further activities may be performed in addition to those described. Still further, the order in which activities are listed are not necessarily the order in which they are performed.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of using a call routing system, the method comprising:
    generating a first action object identifier associated with a task, a first result identifier associated with the task and having a value that indicates a status of the task, and a first reason identifier that includes information related to the first result identifier at a first module in response at least in part to a call using a processor of the call routing system; and
    routing the call from the first module to a second module using the processor, based at least in part on the first action object identifier, the first result identifier, and the first reason identifier.

2. The method of claim 1, wherein the call includes speech of a caller.

3. The method of claim 1, wherein the status of the task indicates whether the task was successful or unsuccessful.

4. The method of claim 1, further comprising:
    routing the call to the first module, wherein the first module is an authentication module; and
    receiving information regarding authentication information of an account, wherein:
        the first action object identifier, the first result identifier, and the first reason identifier are generated, at least in part, based on the information regarding the authentication information; and
        routing the call further comprises forwarding the call, the first action object identifier, the first result identifier, and the first reason identifier to the second module.

5. The method of claim 1, further comprising:
    routing the call to the first module, wherein the first module is an account status module; and
    retrieving account status information of an account associated with a caller of the call;
    wherein:
        generating the first action object identifier, the first result identifier, and the first reason identifier comprises generating the first action object identifier, the first result identifier, and the first reason identifier at least in part based on the account status information; and
        routing the call further comprises forwarding the call, the first action object identifier, the first result identifier, and the first reason identifier to the second module.

6. The method of claim 5, further comprising determining whether the account has a monitor-only status, a restricted status, or a combination thereof.

7. A data processing system comprising:
    a processor;
    a memory coupled to the processor;
    a first module in the memory and executable by the processor to generate, in response to a received call, a first action object identifier associated with a task, a first result identifier associated with the task and having a value that indicates a status of the task, and a first reason identifier that includes information related to the first result identifier; and
    a routing module in the memory and executable by the processor to route the received call from the first module to a second module based at least in part on the first action object identifier, the first result identifier, and the first reason identifier.

8. The data processing system of claim 7, further comprising a disposition module configured to:
    receive an input signal from a controller or an attendant interaction module;
    generate a disposition signal in response at least in part to the input signal; and
    transmit the disposition signal to the routing module.

9. The data processing system of claim 7, further comprising:
    an attendant interaction module configured to:
        transmit the first action object identifier, the first result identifier, and the first reason identifier to a first output port; and
        receive an attendant interaction signal from a first input port;
    a disposition module configured to:
        receive the attendant interaction signal from the attendant interaction module; and
        generate a disposition signal in response at least in part to the attendant interaction signal; and
        transmit the disposition signal to the routing module,
    wherein the routing module is further configured to receive the disposition signal from the disposition module, and wherein the routing module is configured to route the received call from the first module to the second module in response at least in part to the disposition signal.

10. The data processing system of claim 7, wherein the first module is a controller.

11. The data processing system of claim 7, wherein the routing module is configured to:
    receive an input signal from a controller, an attendant interaction module, or a disposition module; and
    route the received call to a third module in response at least in part to the input signal.

12. The data processing system of claim 7, wherein the first module comprises a passcode authentication module to verify a passcode of a caller of the received call, and wherein the second module comprises an attendant interaction module when user input indicates that the caller does not remember the passcode.

13. A data processing system readable medium having data to be used with a call routing system, wherein the data is embodied within the data processing system readable medium, the data comprising:
- instructions to generate a first action object identifier associated with a task, a first result identifier associated with the task and having a value that indicates a status of the task, and a first reason identifier that includes information related to the first result identifier at a first module in response at least in part to a call; and
- instructions to route the call from the first module to a second module based at least in part on the first action object identifier, the first result identifier, and the first reason identifier.

14. The data processing system readable medium of claim 13, wherein the call routing system comprises a speech-enabled, self-service call routing system.

15. The data processing system readable medium of claim 13, wherein the data further comprises instructions to transmit the first action object identifier, the first result identifier, and the first reason identifier from the first module to the second module.

16. The data processing system readable medium of claim 13, wherein the data further comprises instructions to interrupt routing of the call in response to an interrupt signal.

17. The data processing system readable medium of claim 13, wherein the data further comprises instructions to route the call, the first action object identifier, the first result identifier, and the first reason identifier to an attendant interaction module, wherein the second module is the attendant interaction module.

18. The data processing system readable medium of claim 17, wherein the data further comprises instructions to generate a disposition signal in response at least in part to an attendant interaction signal.

19. The data processing system readable medium of claim 18, further comprising instructions to route the call from the second module to a third module based at least in part on the disposition signal.

20. The data processing system readable medium of claim 13, wherein the status of the task indicates whether the task was successful or unsuccessful.

\* \* \* \* \*